United States Patent
Polynin et al.

(10) Patent No.: US 10,585,160 B2
(45) Date of Patent: Mar. 10, 2020

(54) SYSTEMS AND METHODS FOR ACTIVATING A RADIO BEACON FOR GLOBAL AIRCRAFT TRACKING

(71) Applicant: Aviation Communication & Surveillance Systems LLC, Phoenix, AZ (US)

(72) Inventors: Christopher Polynin, Phoenix, AZ (US); Jarett Alan Malone, El Mirage, AZ (US); Christophe Hamel, Maricopa, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 0 days.

(21) Appl. No.: 15/956,486

(22) Filed: Apr. 18, 2018

(65) Prior Publication Data

US 2018/0299530 A1    Oct. 18, 2018

Related U.S. Application Data

(60) Provisional application No. 62/486,892, filed on Apr. 18, 2017, provisional application No. 62/658,414, filed on Apr. 16, 2018.

(51) Int. Cl.
*G01S 5/02* (2010.01)
*G01S 19/17* (2010.01)
*B64D 45/00* (2006.01)
*G08G 5/00* (2006.01)

(52) U.S. Cl.
CPC ............ *G01S 5/0231* (2013.01); *B64D 45/00* (2013.01); *G01S 19/17* (2013.01); *G08G 5/0013* (2013.01); *G08G 5/0021* (2013.01); *G08G 5/0056* (2013.01); *B64D 2045/0065* (2013.01); *G01S 2205/006* (2013.01)

(58) Field of Classification Search
CPC combination set(s) only.
See application file for complete search history.

(56) References Cited

U.S. PATENT DOCUMENTS

| 10,002,519 B2 | 6/2018 | Bekanich |
| 10,102,736 B2 | 10/2018 | Bekanich |
| 10,163,328 B2 | 12/2018 | Bekanich |

(Continued)

FOREIGN PATENT DOCUMENTS

WO    2015186102    12/2015

OTHER PUBLICATIONS

Invitation to Pay Additional Fees and, Where Applicable, Protest Fee issued on related international application PCT/US2018/028188, Jul. 6, 2018 by the European Search Authority.

(Continued)

*Primary Examiner* — Travis R Hunnings
(74) *Attorney, Agent, or Firm* — Dickinson Wright PLLC

(57) ABSTRACT

An autonomous distress tracking system for an aircraft is described. The system can include a transponder configured to transmit radio frequency (RF) emissions and an RF detector unit configured to detect the RF emissions. The system can further include an alert system that is in communication with the RF detector unit and be configured to activate a distress radio beacon if no RF emissions are detected within a predetermined period of time.

20 Claims, 6 Drawing Sheets

(56) References Cited

U.S. PATENT DOCUMENTS

| | | | |
|---|---|---|---|
| 2001/0020901 A1* | 9/2001 | McHugh | A62C 35/605 |
| | | | 340/686.1 |
| 2002/0030607 A1* | 3/2002 | Conner | B64C 27/82 |
| | | | 340/945 |
| 2006/0007020 A1 | 1/2006 | Biermann | |
| 2006/0032987 A1 | 2/2006 | Akers et al. | |
| 2008/0055095 A1* | 3/2008 | Hackmeister | B64D 15/20 |
| | | | 340/583 |
| 2012/0146809 A1* | 6/2012 | Oh | G07C 5/085 |
| | | | 340/901 |
| 2016/0047880 A1* | 2/2016 | Helfrick | G01S 5/0231 |
| | | | 340/981 |
| 2016/0017653 A1 | 6/2016 | Bekanich | |
| 2017/0106997 A1 | 4/2017 | Bekanich | |

OTHER PUBLICATIONS

Notification of Transmittal of the International Search Report and the Written Opinion of the International Searching Authority, or the Declaration issued on related international application PCT/US2018/028188, dated Aug. 27, 2018 by the European Search Authority.

* cited by examiner

SYSTEMS AND METHODS FOR ACTIVATING A RADIO BEACON FOR GLOBAL AIRCRAFT TRACKING

CROSS-REFERENCE TO RELATED APPLICATION(S)

This application claims priority to and the benefit of U.S. Provisional Application Patent Ser. No. 62/486,892, filed Apr. 18, 2017, and U.S. Provisional Application Patent Ser. No. 62/658,414, filed Apr. 16, 2018, the entire disclosures of which are hereby incorporated by reference.

BACKGROUND

The current air navigation system has limitations that affect timely identification and localization of aircraft in distress. This leads to ineffective search, rescue, and recovery efforts. To increase the effectiveness of alerting and search and rescue ("SAR") services, the International Civil Aviation Organization ("ICAO") has implemented a Global Aeronautical Distress and Safety System ("GADSS"). Information management and procedures within the GADSS framework, such as an Automatic Dependent Surveillance-Broadcast ("ADS-B"), are being evaluated to address the future global tracking requirements.

ICAO and other regulators envision three kinds of aircraft tracking: 1) Aircraft Tracking Normal Operations ("Normal Tracking"); 2) Aircraft Tracking Abnormal Operations ("Abnormal Tracking"); and 3) Autonomous Distress Tracking ("ADT"). The Aircraft Tracking Normal Operations is a possible subset of Air Traffic System ("ATS") surveillance used for airline operational functions. Normal Tracking occurs continuously from takeoff to landing and tracks where the airplane travels. Information pertaining to a position of the airplane is transmitted at least once every fifteen minutes via a position report. The position report can include information, such as latitude, longitude, altitude, and heading information. If available, surveillance can be substituted for Normal Tracking. The Abnormal Tracking and ADT are triggered by an abnormal event and provide flight location data at least once per minute in response to a trigger. Abnormal Tracking can be triggered when the airplane is in the air or on the ground. If available, surveillance can be substituted for Abnormal Tracking. ADT can be triggered by a very specific set of conditions being defined, for example, by Special Committee SC-229. The ADT is a formal distress signal that initiates SAR protocols. The ADT is independent of aircraft power loss and continues to transmit after a loss of aircraft power for the duration of the flight. It is required that the ADT provides a crash site location within six nautical miles of the crash site (or a one minute minimum update rate). Furthermore, the ADT system cannot be isolated and should be independent of Normal and Abnormal Tracking. However, because all three kinds of aircraft tracking are controllable by the flight crew, or another person, the systems can be disabled or tampered with. Thus, there is a need for a tamperproof avionics system by which an aircraft could be located and/or tracked down in case of an abnormal or distress event.

SUMMARY

This section provides a general summary of the present disclosure and is not a comprehensive disclosure of its full scope or all of its features, aspects, and objectives.

Disclosed herein are exemplary implementations of an autonomous distress tracking system for an aircraft. One exemplary system includes a transponder configured to transmit radio frequency (RF) emissions and an RF detector unit configured to detect the RF emissions. The system further includes an alert system that is in communication with the RF detector unit and be configured to activate a distress radio beacon if no RF emissions are detected within a predetermined period of time.

Also disclosed herein are exemplary implementations of a method for activating a locator beacon for global aircraft tracking. An exemplary method includes detecting aircraft operations and identifying an abnormal event based on the aircraft operations. The method further includes determining if the abnormal event was intentional and activating the locator beacon if the abnormal event was not intentional.

Also disclosed herein are exemplary implementations of a system for activating a radio beacon on an aircraft. An exemplary system includes a transponder and an RF detector. The transponder is installed on the aircraft at a first location and the RF detector installed on the aircraft at a second location. The transponder is configured to transmit coded information readable by the RF detector and the RF detector is configured to trigger activation of the radio beacon based on the coded information.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following description is merely exemplary in nature and is not intended to limit the disclosure in its application or uses. For purposes of clarity, the same reference numbers are used in the description and drawings to identify similar elements.

The present disclosure relates generally to an avionics system by which an aircraft can be located and/or tracked down in the event of an abnormal event, such as a distress event, a catastrophic emergency, hijacking, etc. The avionics system can use electronic and/or visual signals. The avionics system can be installed inside or outside of the aircraft and away from the cockpit and passenger/cargo compartments to eliminate access to external controls that could otherwise be tampered with.

Figure 1:
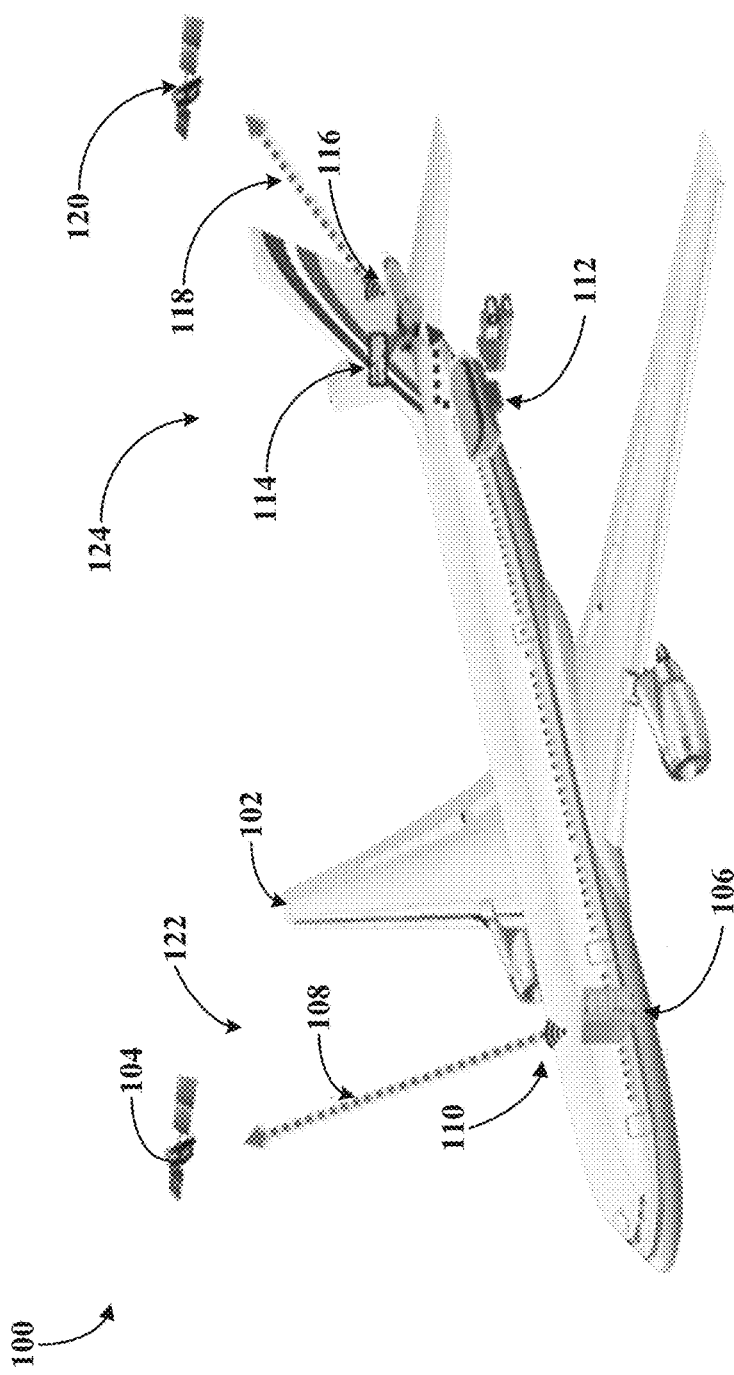
FIG. 1 is a perspective view of an aircraft implementing an exemplary avionics system used to activate a radio beacon through an aircraft transponder in accordance with aspects of the present disclosure.

FIG. 1 illustrates an avionics system 100 of an aircraft 102 for activating a radio beacon through an aircraft transponder in accordance with aspects of the present disclosure. The avionics system 100 can include additional and/or fewer components and is not limited to those illustrated in FIG. 1. As shown above by way of example, the avionics system 100 can include and/or communicate with at least the following components: a first satellite 104, a transponder 106 that can include trigger logic for transmitting an Automatic Dependent Surveillance-Broadcast ("ADS-B") out 108 via a first antenna 110, an Automatic Direction Finder Recorder ("ADFR") 112 that can include trigger logic, an ELT/RF module 114 that can include an Emergency Locator Transmitter-Distress Tracking ("ELT-DT") unit and an RF detector, and a second antenna 116 for transmitting a wireless distress trigger 118, for example, to a second satellite 120.

The aircraft 102 can also include a first communication system 122 and a second communication system 124. The first communication system 122 can include the transponder 106, which can transmit ADS-B out 108 to the first satellite 104. The first satellite 104 can be a space-based ADS-B-capable satellite. The aircraft 102 can determine its position via satellite navigation or any other desired means and periodically broadcast the information to the transponder 106 for transmission, which enables the aircraft 102 to be tracked via ADS-B out 108. In this way, the transponder 106 can be used as a part of the aircraft's surveillance system. The information from the transponder 106 can be received by air traffic control (ATC) ground stations or other aircraft. In other words, the transponder 106 can periodically (e.g. every second or any other desired periodicity) broadcast real-time information about the aircraft 102 through the transponder 106 located on the aircraft 102. Such transmissions of information, for example, position and velocity data, make the aircraft 102 visible in real-time to the ATC and other appropriately equipped aircraft.

The transponder 106 can also include trigger logic, such as distress trigger logic. The distress trigger logic can monitor the aircraft's performance to determine whether a distress event has occurred. If a distress event has occurred, then the transponder 106 can be activated and a distress signal can be sent to the first satellite 104. The transponder 106 can also send coded information to a matched RF detector located on the same aircraft to wirelessly activate a beacon or locator. The RF detector is identified in the second communication system 124 in more detail below. The distress trigger logic can be hosted inside the transponder 106. When the distress trigger logic is hosted in the transponder 106, there is no impact to the aircraft wiring or to a Line-Replaceable Unit ("LRU") count. Alternatively, the distress trigger logic can be hosted external from the transponder 106 and wired to the transponder 106 to detect any distress events.

The second communication system 124 can include the ELT/RF module 114. The ELT/RF module 114 can be configured to function as an alert system. The ELT/RF module 114 can include the RF detector and the ELT-DT unit for detecting information and transmitting the information, respectively, to the second satellite 120. The second satellite 120 can be a COSPAS SARSAT or any other suitable satellite type. The COSPAS SARSAT is a system that can detect and locates radio beacons, such as distress beacons that are activated, for example, by aircraft, ships, and people in remote areas. After an activated distress beacon is detected, the COSPAS SARSAT can send the distress alerts to SAR authorities.

The RF detector monitors transmissions, such as 1090 MHz transmissions, sent by the transponder 106. The RF detector can be located in the ELT/RF module 114, an RF detector unit 252, the ELT-DT unit, or in any other desired location, such as a stand-alone unit. For example, the RF detector can be installed in-line between the transponder 106 and the first antenna 110 or in any other desired location, such as in a separate LRU. The RF detector could be integrated into any LRU, such as an LRU for the ELT or any other LRU, given that the ELT/RF module 114 cannot be disabled.

When the transponder 106 sends a distress bit or the transponder 106 stops sending any RF transmissions (i.e. all RF transmissions cease), the RF detector can activate the ELT-DT unit. The avionics system 100 can then activate a radio beacon, such as the wireless distress trigger 118, for global aircraft tracking. The wireless distress trigger 118 can be received by the second satellite 120, such as the COSPAS SARSAT, or another satellite, aircraft, organization, or device.

The second communication system 124 can also include the ADFR 112 with optional trigger logic. The distress trigger logic can be hosted externally. The external system can be wired to the ADFR 112 and used to detect any distress events. The ADFR 112 can record flight information from the aircraft's navigation system. For example, the ADFR 112 can record information from the aircraft's position report, aircraft avionics systems and sensor data, and other information. The flight information can be downloaded for post-flight analysis. The trigger logic can be activated if it detects an abnormal event, such as a distress event or when the aircraft 102 enters into a distress tracking mode. For example, if the trigger logic determines that a distress event has occurred, such as an emergency of the aircraft 102 or that no RF transmissions are being sent from the aircraft 102 (i.e., all or both transponders failed or are in an OFF state) within a specified period of time, the wireless distress trigger 118 via the ELT-DT unit can be activated. Additionally, the transponder 106 can transmit dedicated information to a compatible or matched RF detector on the same aircraft to activate the wireless distress trigger 118. The ELT-DT unit can also inform the SAR authorities that the aircraft 102 is in distress.

Figure 2:
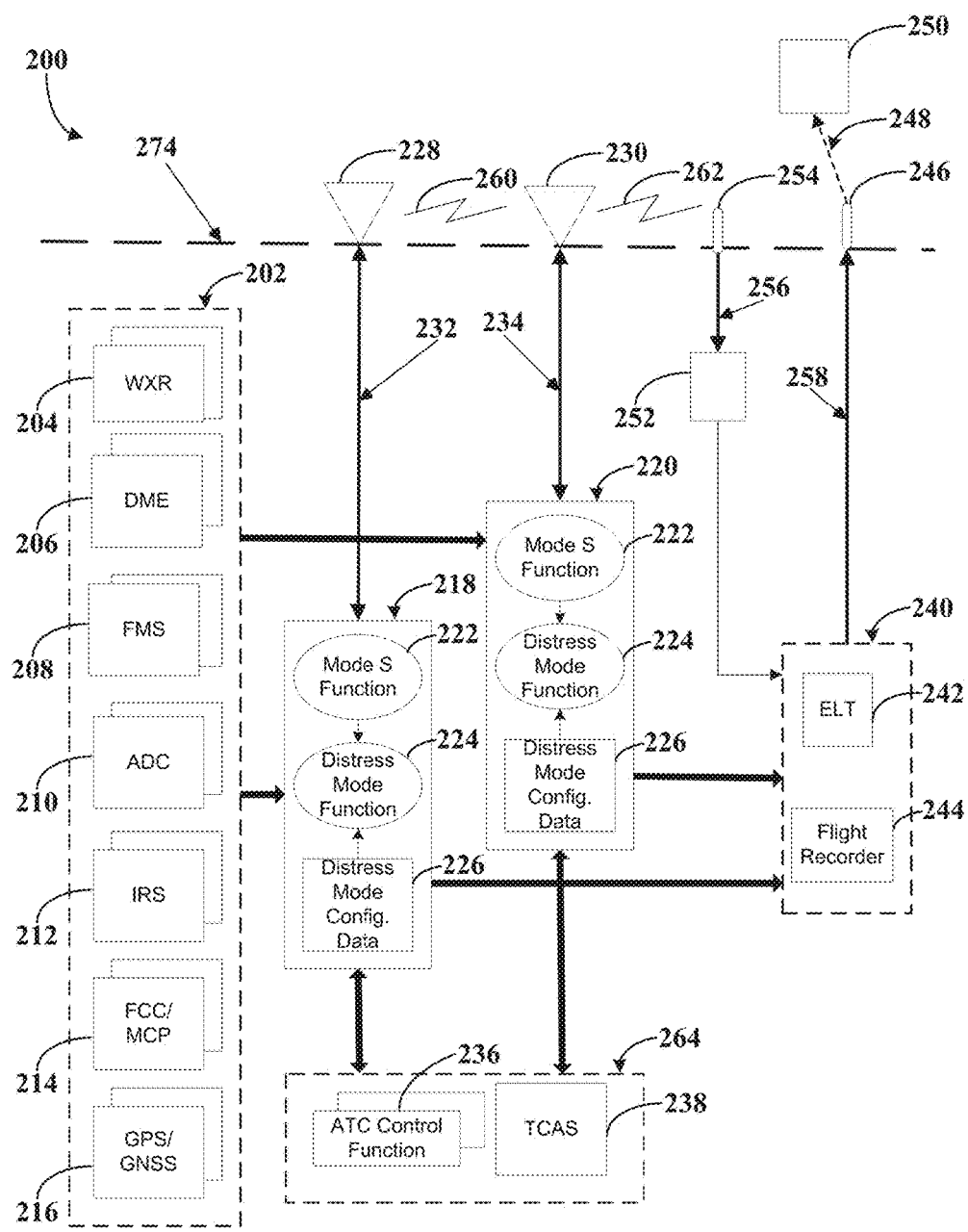
FIG. 2 is a simplified block diagram depicting exemplary components of a global aircraft tracking radio beacon activation system in accordance with one aspect of the present disclosure.

FIG. 2 illustrates a global aircraft tracking radio beacon activation system, or system 200 in accordance with aspects of the present disclosure. The system 200 can include aircraft avionics systems and sensor data 202. The aircraft avionics systems and sensor data 202 can include a weather radar system ("WXR") 204, a distance measuring equipment ("DME") 206, a flight management system ("FMS") 208, an air data computer ("ADC") 210, an inertial reference system ("IRS") 212, a flight control computer ("FCC")/mode control panel ("MCP") 214, and a global positioning system ("GPS")/global navigation satellite system ("GNSS") 216. The system 200 can include a sensor or another device or form of communication for detecting, receiving, and/or transmitting data to/from the aircraft avionics systems.

The aircraft avionics systems and sensor data 202 can transmit aircraft avionics systems and sensor data separately to a first transponder unit 218 and to a second transponder unit 220. The aircraft avionics systems and sensor data 202 can include, for example, information contained in a position report; position, velocity, acceleration, airspeed, altitude, orientation data, or any other desired parameter of the aircraft 102; transponder mode and/or status data; aircraft control surface position and flight control system data; distress mode configuration data; in-air/on ground and phase of flight data; weather radar data; or any other desired data concerning the aircraft 102.

The transponder units 218, 220 can each include a Mode S function 222, a distress mode function 224, and distress mode configuration data 226. The Mode S function 222 can be a secondary surveillance radar process that allows selective surveillance of the aircraft 102 according to a unique 24-bit address assigned to the aircraft 102. The Mode S function 222 transmits information to the distress mode function 224. The distress mode function 224 can be configured to increase communication when the aircraft 102 is in a distress mode, including the activation of the distress beacon (ELT, recorder, etc.) under a predefined set of criteria. The distress mode configuration data 226 can also send information, for example, configuration data to the distress mode function 224.

The transponder units 218, 220 can be connected to a first antenna 228 and a second antenna 230 via a first cable 232 and a second cable 234, respectively. The antennas 228, 230 can be L-band antennas, or another type of antenna used for receiving and/or transmitting information, such as transponder RF transmissions 260, 262, respectively. The cables 232, 234 can be RF coaxial cables, or any other desired cables or wiring. The transponder units 218, 220 can also be wirelessly connected to the antennas 228, 230. The antennas 228, 230 can be located inside or outside of the aircraft fuselage 274 (i.e. the main body section of the aircraft 102). The antennas 228, 230 can also be located internally as part of the transponder units 218, 220 (i.e. integrated within the transponder units 218, 220).

The transponder units 218, 220 can separately communicate to an air traffic control ("ATC")/traffic collision avoidance system ("TCAS") System Control (hereinafter, ATC/TCAS 264). The ATC/TCAS 264 can include an ATC control function 236 and a TCAS 238. The communication between the transponder units 218, 220 and the ATC/TCAS 264 can include TCAS/transponder coordination data, traffic advisory (TA) and resolution advisory (RA) information, distress mode configuration data, or any other desired data.

The transponder units 218, 220 can also communicate directly to a distress beacon system 240. The distress beacon system 240 can include a flight recorder 244 and an ELT 242. The flight recorder 244, such as the ADFR 112, can be configured to record flight information from the aircraft's navigation system. The flight information can include a variety of information, such as location, heading, elevation, ascent/decent, banking, airspeed, acceleration/deceleration, or any other desired flight information. The flight information can be downloaded for post-flight analysis. The ELT 242 can be configured to transmit a radio beacon. For example, the ELT 242 can function as an alert system to transmit a distress radio beacon. The distress beacon system 240 can be connected to a distress beacon system antenna, or antenna 246 via a cable 258, such as an RF coaxial cable. Alternatively, the distress beacon system 240 can communicate wirelessly to the antenna 246 or communicate using another type of connection. The transponder units 218, 220 can be configured to send distress mode and trigger data to the distress beacon system 240. If either of the transponder units 218, 220 send a distress mode and/or trigger data to the distress beacon system 240, the distress beacon system 240 can evaluate the information and when appropriate, activate a radio beacon 248, such as a distress beacon, to a satellite 250. In this configuration, the activation of the distress beacon (ELT, recorder, etc.) under a predefined set of criteria can be automated, and thus, tamperproof.

The transponder units 218, 220 can also communicate via the antennas 228, 230 to an RF detector unit 252. The RF detector unit 252 can be connected to an antenna 254, such as an RF detector antenna, via a cable 256, such as an RF coaxial cable. Alternatively, the RF detector unit 252 can communicate wirelessly to the antenna 254 or communicate using another type of connection. The antenna 254 can receive information from antennas 228, 230 and transmit the information to the RF detector unit 252.

The RF detector unit 252 can be configured to measure transponder RF transmissions 260, 262 and/or other RF emissions to/from the aircraft 102. As transponder units 218, 220 can be required to transmit information or data periodically, the RF detector unit 252 can be used to determine any time there is a lack of transmissions. If the RF detector unit 252 does not detect RF transmissions from the aircraft 102 (e.g., transmitted from either transponder unit 218, 220), the system 200 can similarly activate the radio beacon 248 (e.g. the distress beacon). In doing so, the RF detector unit 252 can be configured to transmit RF activity status/trigger data to the distress beacon system 240. The distress beacon system 240 can then, when appropriate, activate the radio beacon 248 as a distress or locator beacon.

The RF detector unit 252 can be a separately installed device. The RF detector unit 252 can be installed on the skin of the aircraft next to the TCAS 238, on one of the transponder antennas 228, 230, or any other desired location. For example, the RF detector unit 252 can be installed in-line between the transponder unit 218 and the antenna 228, between the transponder unit 220 and the antenna 230, in any other desired location as a separate LRU. The RF detector unit 252 can also be integrated into any LRU, such as an LRU for the ELT 242 or any other LRU, given that the integrated unit cannot be disabled. Furthermore, the RF detector unit 252 can be powered through an internal battery to ensure that the RF detector unit 252 cannot be disabled during flight, as well as keeping the RF detector unit 252 powered during a complete loss of aircraft power. The RF detector unit 252 can be powered, for example, by 28 VDC or 115 V 400 Hz from the aircraft 102.

As shown above by way of example, leveraging a satellite payload, such as an Aireon ADS-B satellite payload on the Iridium constellation, airlines can use the ADS-B system to meet the normal and other tracking needs worldwide. However, a potential challenge with this ADS-B space-based solution is to address the automated distress tracking mode. To address this, several solutions may be possible, among them being moving the transponder breakers or transponder units out of the cockpit. Pursuant to embodiments of the present invention, the system 200 can be activated when it detects that the aircraft 102 strayed from perceived normal operation as described above. In one exemplary embodiment of the present disclosure, the ELT unit can be activated if neither of the transponder units 218, 220 detect any transponder RF transmissions 260, 262 from the aircraft 102 (i.e., all transponders have failed or are in an OFF state). By incorporating a radio beacon 248 into the ADS-B system or systems 200, a full complement of distress conditions can be addressed without the need to move either of the transponder units 218, 220.

Figure 3:
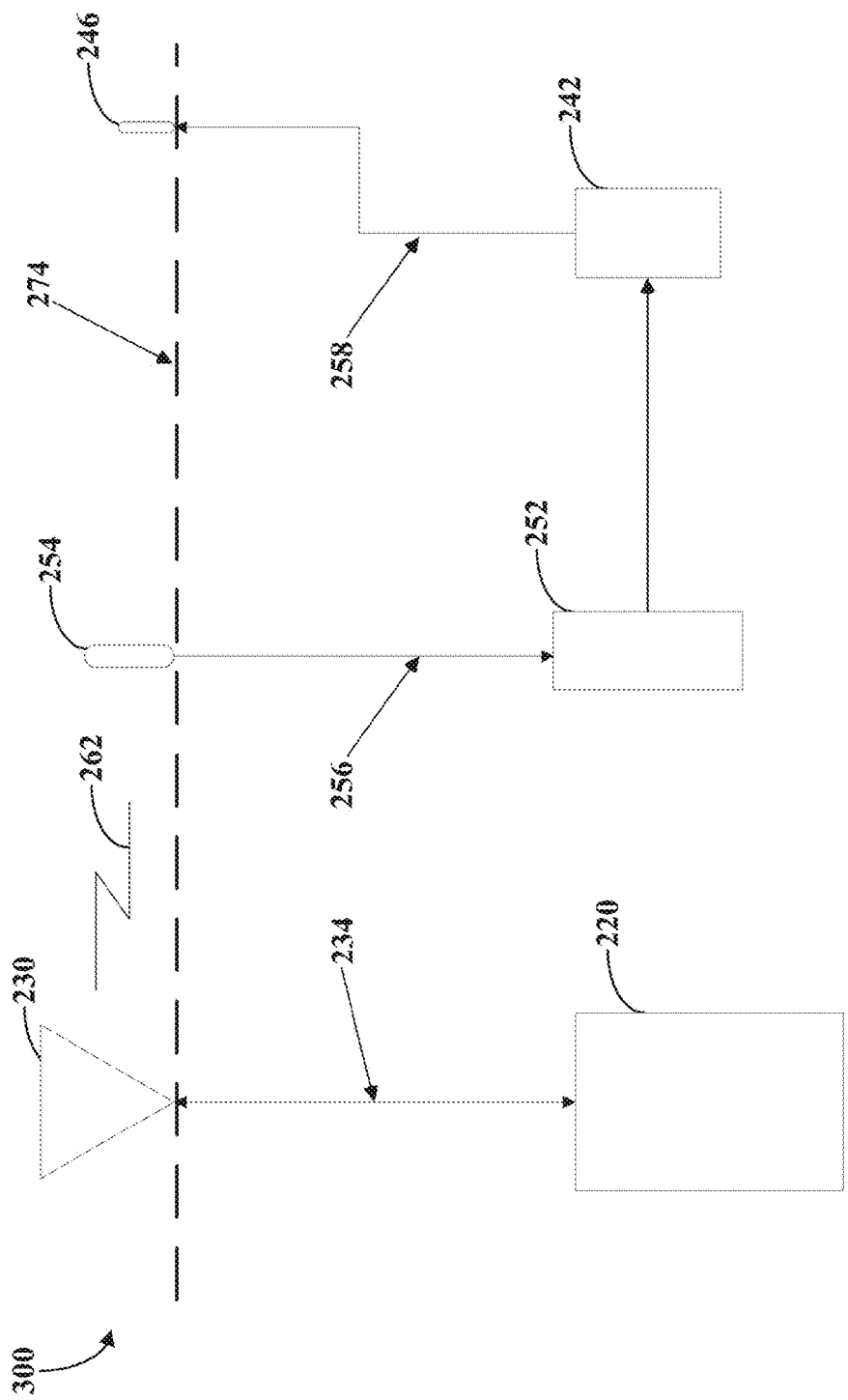
FIG. 3 is a simplified block diagram depicting exemplary components of an avionics system using a stand-alone radio frequency ("RF") detector in accordance with one aspect of the present disclosure.

FIG. 3 illustrates an avionics system 300 using a stand-alone RF detector, such as the RF detector unit 252 in accordance with aspects of the present disclosure. The transponder unit 220 can be a Mode-S transponder unit or another transponder device. The transponder unit 220 transmits transponder RF transmissions 262 to the RF detector unit 252. The transponder RF transmissions 262 travel from the transponder unit 220 through the cable 234 and then can be transmitted from the antenna 230 to the antenna 254 to travel through the cable 256 to the RF detector unit 252. The RF detector unit 252 can be configured to send RF activity status or trigger data to the ELT 242. The ELT 242 can activate the radio beacon 248 by sending a transmission (e.g. an RF transmission) through the cable 258 to an ELT antenna, or antenna 246. The radio beacon 248 can be transmitted via the antenna 246, for example, to the ATC or the SAR via a satellite. The antennas 230, 254, and 246 can be located within the aircraft fuselage 274 (i.e. within the aircraft's main body section) or external or outside of the aircraft fuselage 274. The antennas 230, 254, and 246 can also be located internally of the transponder unit 220, the RF detector unit 252, and the ELT 242, respectively. For example, the RF detector unit 252 can have an internal antenna for the electronic beacon to prevent tampering. An external antenna port can also be configured. Furthermore, the antennas 230, 254, and 246 can be any of a variety of antennas types, including, but not limited to, an L-Band antenna, an RF detector antenna, and an ELT antenna, respectively. Additionally, the avionics system 300 can transmit 10-20 watts or any other desired range to allow for the electronic signal to penetrate through areas, such as deep water, dense foliage, etc.

Figure 4:
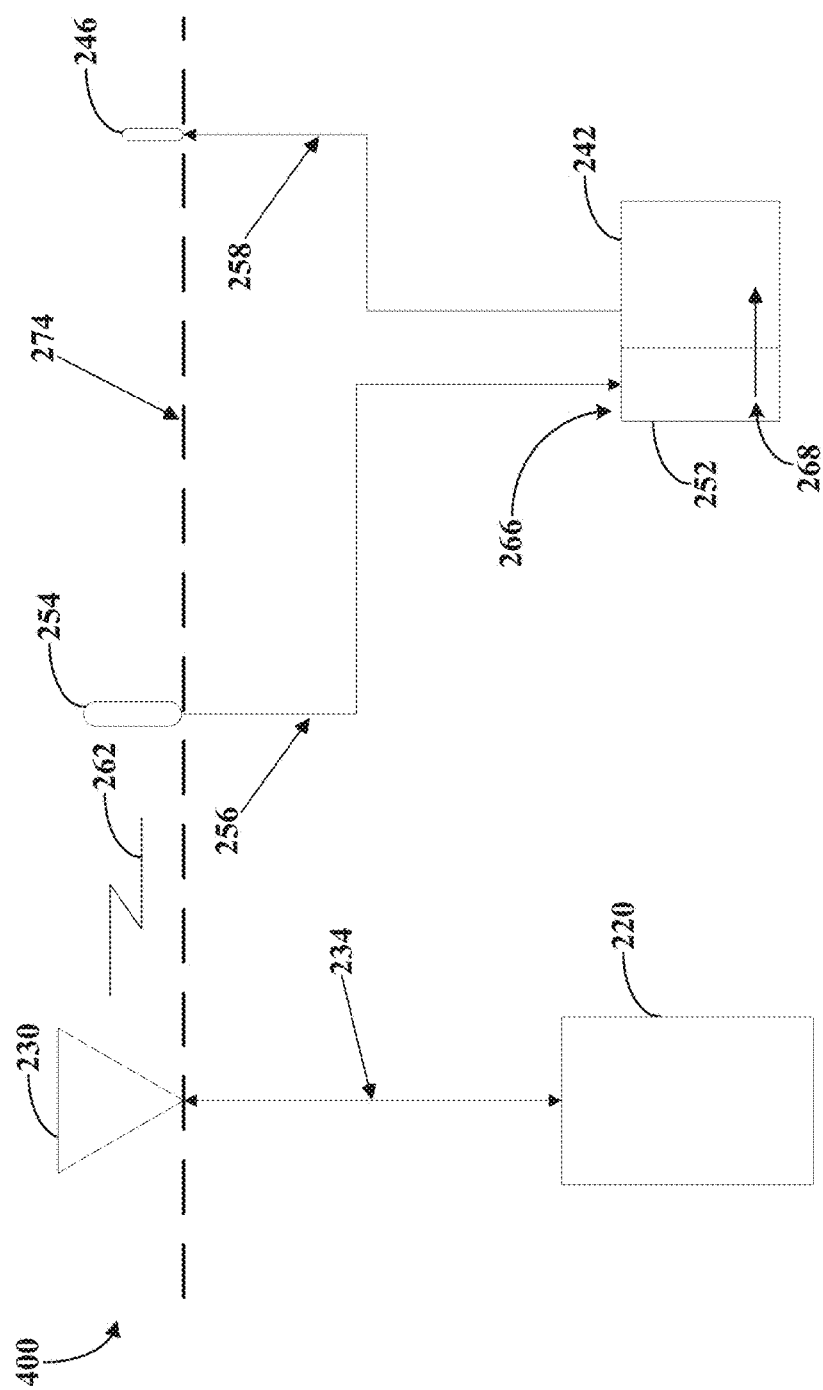
FIG. 4 is a simplified block diagram depicting exemplary components of an avionics system using an RF detector integrated into an Emergency Locator Transmitter (ELT) unit in accordance with aspects of the present disclosure.

FIG. 4 illustrates an avionics system 400 using an RF detector module integrated into an ELT module in accordance with aspects of the present disclosure. The avionics system 400 is similar to the avionics system 300 described above, with a few exceptions. More specifically, the transponder unit 220 transmits transponder RF transmissions 262 to the RF detector unit 252 via an RF integrated unit 266. The RF integrated unit 266 can include the RF detector unit 252 and the ELT 242. The RF detector unit 252 and the ELT 242 can be integrated to allow for internal communication 268, such as RF activity status or trigger data, to travel internally from the RF detector unit 252 to the ELT 242. The ELT 242 can activate the radio beacon 248 by sending a transmission through the cable 258 to the antenna 246 as described above.

Figure 5:
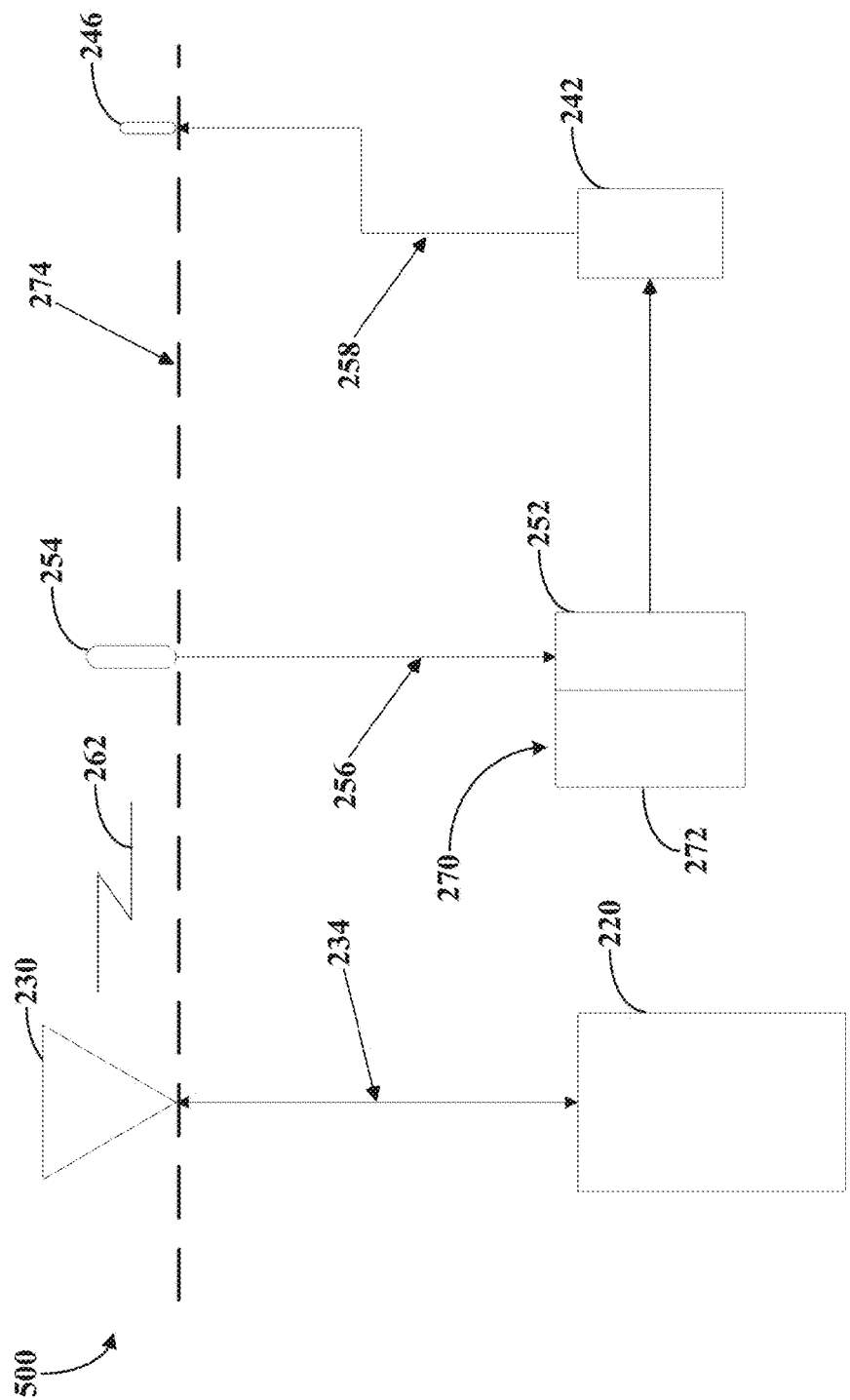
FIG. 5 is a simplified block diagram depicting exemplary components of an avionics system using an RF detector integrated into a Line-Replaceable Unit ("LRU") in accordance with aspects of the present disclosure.

FIG. 5 illustrates an avionics system 500 using an RF detector integrated into a LRU in accordance with aspects of the present disclosure. The avionics system 500 is similar to the avionics system 300 described above, with a few exceptions. More specifically, the transponder unit 220 transmits transponder RF transmissions 262 to the RF detector unit 252 via a non-RF integrated unit 270. The non-RF integrated unit 270 can include the RF detector unit 252 and a non-ELT device 272. The non-ELT device 272 can be a LRU or another device that does not have RF functions. The RF detector unit 252 and the non-ELT device 272 can be integrated to allow for internal communication, transfer of power, or any other function. The RF detector unit 252 can transmit RF activity status or trigger data to the ELT 242. The ELT 242 can activate the radio beacon 248 by sending a transmission through the cable 258 to the antenna 246 as described above. The systems 300, 400, 500 can include additional and/or fewer components and configurations and are not limited to those illustrated in FIGS. 3-5.

Figure 6:
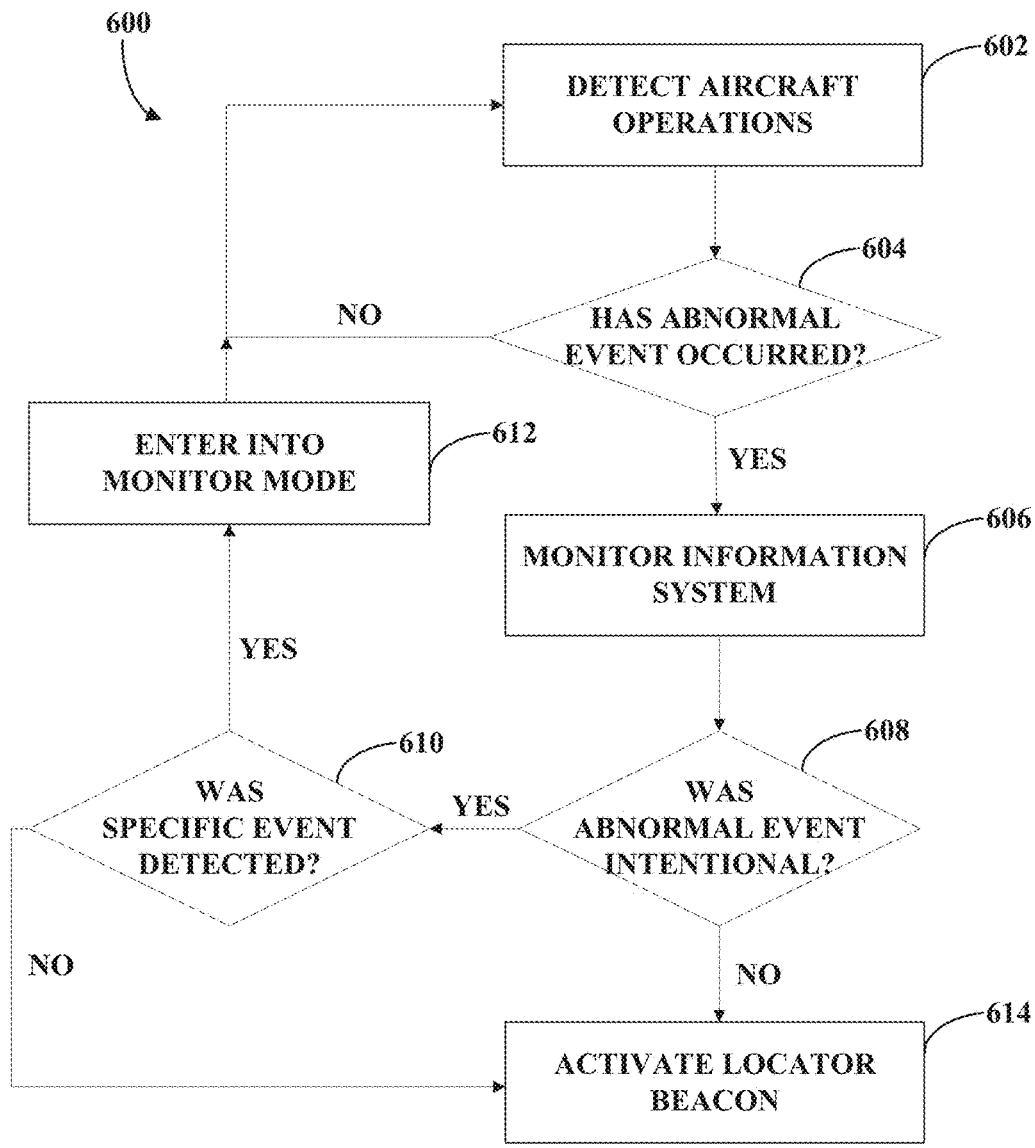
FIG. 6 is a flow chart illustrating an exemplary method for activating a locator beacon in accordance with aspects of the present disclosure.

FIG. 6 illustrates an exemplary method 600 for activating a radio beacon (e.g. locator beacon) from any of the exemplary systems illustrated in and described with respect to FIGS. 1-5 or any variations thereof. At step 602, the system detects aircraft operations.

At decision step 604, the system determines if some other abnormal event has occurred (e.g. that the aircraft strayed form a perceived normal operation). Abnormal events can include, but are not limited to the following situations: 1) the aircraft suddenly ascends/descends out of a range of normal operation for the aircraft; 2) the aircraft suddenly banks in a manner that is out of range of normal operation for the aircraft; 3) the aircraft suddenly changes in airspeed beyond a predefined acceptable airspeed change, at any time during the flight but typically when the aircraft 102 is at a greater than predetermined distance from an airport; or 4) any or all installed transponders are determined as not operating or not functioning properly. If the system does not detect an abnormal event, then the system proceeds back to step 602. If the system determines that an abnormal event has occurred, then the system proceeds to step 606.

At step 606, the system can monitor at least one information system. Some exemplary information systems can include any of the systems identified above in the aircraft avionics systems and sensor data 202, the TCAS, transponder busses, or any other desired system that provides sensor data, avionics data, or any other desired information. The TCAS can be an aircraft collision avoidance system used for reducing the incidence of mid-air collisions between aircraft. The TCAS may issue a traffic advisory ("TA"), a resolution advisory ("RA"), or by the absence of a TA and an RA, indicate that the aircraft is clear of conflict. The system can monitor the TCAS for current traffic conditions and alerts. The system can monitor transponder busses to detect whether each transponder is in an ON state or an OFF state. Furthermore, the transponder busses can be monitored for proper function (i.e., whether each transponder is working properly). The system can also monitor a weather radar system, such as WXR 204 for weather conditions. For example, the system can monitor if there is a change in weather pattern, type of weather condition, wind speed, temperature, or any other desired weather condition.

At decision step 608, the system determines if various factors, such as changes in elevation, heading, or speed was initiated intentionally. The system can determine this from the data or information collected by monitoring the information system(s) in step 606. For example, the system can determine if a TA/RA event was occurring, if the transponders were turned off, or if a weather event or condition was occurring that would cause the aircraft 102 to suddenly or drastically change its flight pattern, such as elevation, heading, or speed. If the system determines that the abnormal event was not intentional, then the system proceeds to step 614. If the system determines that the abnormal event was intentional, then the system proceeds to decision step 610.

At decision step 610, the system determines if a specific event occurred. The specific event can be any one of a number of events, such as if a TA/RA event has occurred, if both or all of the transponders are in an OFF state, if at least one transponder is in an OFF state but was properly functioning before entering the OFF state (i.e., at least one transponder was properly functioning when exiting the ON state), or a weather condition or event occurred outside of a set of normal parameters. In the situation of no transmissions being detected or a properly functioning transponder being turned off, the system determines that the transponder may have been tampered with and can activate the locator beacon, informing proper authorities of the location of the aircraft 102 or that the aircraft 102 has an emergency. If the system determines that no specific event detected, then the system proceeds to step 614. If the system determines that the specific event was detected, then the system proceeds to step 612.

At step 612, the system enters into a monitor mode. For example, if the system detects that a TA/RA event is occurring, it reverts to the monitor mode for a period of time (e.g., several seconds) to allow the other aircraft to complete the necessary maneuvers. As described above, the system can monitor transponder busses to determine whether the transponders have been turned off and whether the transponders were functioning properly when the transponders were turned off (e.g. entered into an OFF state). If the transponders have been turned off but were not functioning or working properly when they were turned off, then the system enters into a monitor mode. As described above, the system can monitor the weather radar to determine if a specific event was occurring that would require the aircraft to change elevation, heading, or speed. If the system determines that such a specific event was occurring at the time of the aircraft maneuver, it can revert to a "monitor" mode for a period of time (e.g., several seconds) to allow the aircraft 102 to complete the necessary maneuver. The system then proceeds back to step 602. The system may exit the monitor mode before proceeding to step 602, remain in the monitor mode for a period of time, and/or remain in the monitor mode while detecting aircraft operations in step 602.

At step 614, the system can activate the locator beacon. The locator beacon can be used to assist authorities in locating the aircraft 102. By incorporating a beacon into the system, such as the ADS-B system, a full complement of distress conditions can be addressed without the need to move transponder breakers. The methods described in FIG. 6 can include additional and/or fewer components and/or steps in an alternative order and are not limited to those illustrated in this disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An autonomous distress tracking system for an aircraft, comprising:
   a transponder configured to transmit radio frequency (RF) emissions;
   an RF detector unit configured to detect the RF emissions;
   an alert system in communication with the RF detector unit and configured to activate a distress radio beacon if no RF emissions are detected within a predetermined period of time; and
   wherein the transmitter includes a mode S function, a distress mode function, and distress mode configuration data.

2. The autonomous distress tracking system of claim 1, wherein the RF detector unit includes an internal antenna.

3. The autonomous distress tracking system of claim 1, further comprising:
   a line-replaceable unit (LRU), wherein the RF detector unit is coupled with the LRU.

4. The autonomous distress tracking system of claim 1, wherein the alert system includes an emergency locator transmitter (ELT).

5. The autonomous distress tracking system of claim 3, wherein the RF detector unit is coupled with the ELT, and wherein communication is transmitted internally from the RF detector unit to the ELT.

6. The autonomous distress tracking system of claim 1, wherein the transponder is installed at a first location and the RF detector unit is installed at a second location.

7. The autonomous distress tracking system of claim 1, wherein the RF detector unit is installed on at least one of a skin of the aircraft, between the transponder and an antenna, and as a separate LRU.

8. The autonomous distress tracking system of claim 1, wherein the RF detector includes an internal battery.

9. The autonomous distress tracking system of claim 1, further comprising:
   a second transponder, wherein the transponder is installed at a first location and the second transponder is installed at a second location, and wherein the transponder and the second transponder function independently.

10. The autonomous distress tracking system of claim 1, further comprising:
    a navigation system, wherein the navigation system collects flight information; and
    a flight recorder, wherein the flight recorder is configured to record the flight information.

11. An autonomous distress tracking system for an aircraft, comprising:
    a transponder configured to transmit radio frequency (RF) emissions;
    a second transponder, wherein the transponder is installed at a first location and the second transponder is installed at a second location, and wherein the transponder and the second transponder function independently;
    an RF detector unit configured to detect the RF emissions; and
    an alert system in communication with the RF detector unit and configured to activate a distress radio beacon if no RF emissions are detected within a predetermined period of time.

12. The autonomous distress tracking system of claim 1, wherein the RF detector unit includes an internal antenna.

13. The autonomous distress tracking system of claim 1, further comprising:
    a line-replaceable unit (LRU), wherein the RF detector unit is coupled with the LRU.

14. The autonomous distress tracking system of claim 11, wherein the alert system includes an emergency locator transmitter (ELT).

15. The autonomous distress tracking system of claim 14, wherein the RF detector unit is coupled with the ELT, and wherein communication is transmitted internally from the RF detector unit to the ELT.

16. The autonomous distress tracking system of claim 11, wherein the transponder is installed at a first location and the RF detector unit is installed at a second location.

17. The autonomous distress tracking system of claim 11, wherein the RF detector unit is installed on at least one of a skin of the aircraft, between the transponder and an antenna, and as a separate LRU.

18. The autonomous distress tracking system of claim 11, wherein the RF detector includes an internal battery.

19. The autonomous distress tracking system of claim 11, wherein the transmitter includes a mode S function, a distress mode function, and distress mode configuration data.

20. The autonomous distress tracking system of claim 11, further comprising:
- a navigation system, wherein the navigation system collects flight information; and
- a flight recorder, wherein the flight recorder is configured to record the flight information.

* * * * *